Oct. 9, 1962    B. WALKER    3,057,423
HYDRAULIC JACK
Filed Dec. 16, 1957    3 Sheets-Sheet 1
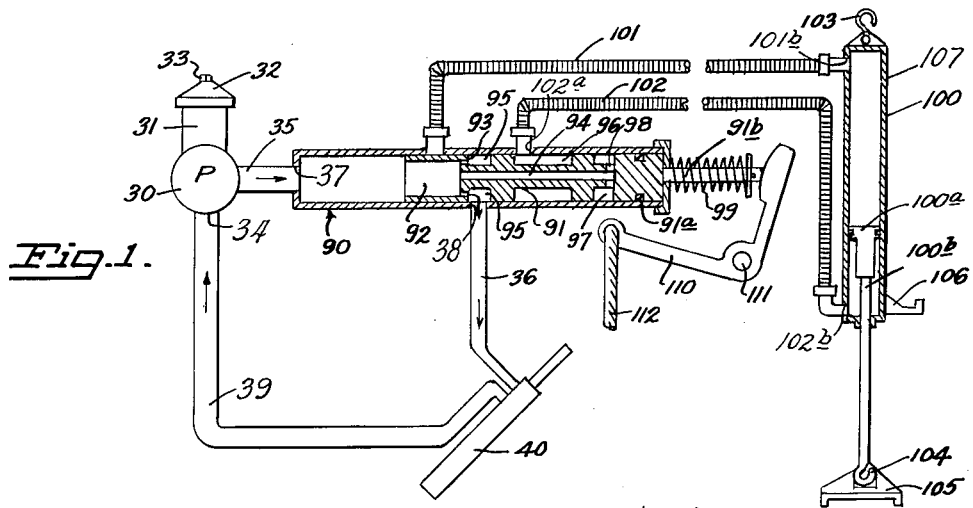
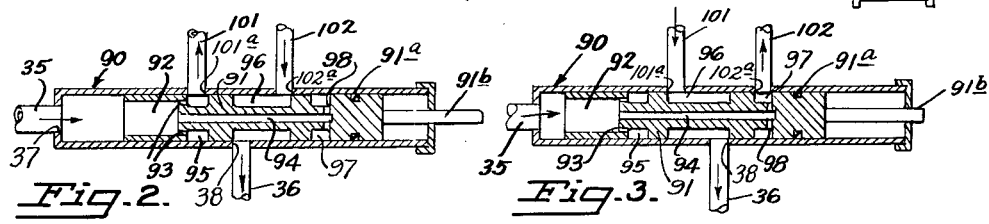
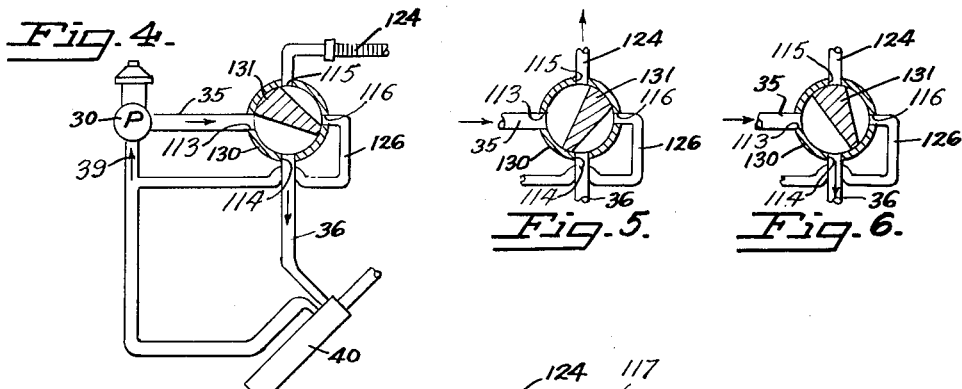
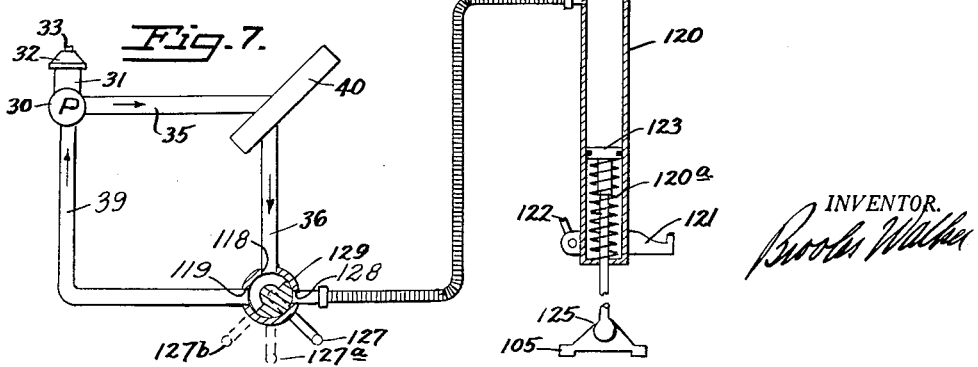
INVENTOR.
Brooks Walker Oct. 9, 1962 B. WALKER 3,057,423
HYDRAULIC JACK
Filed Dec. 16, 1957 3 Sheets-Sheet 2

INVENTOR.
Brooks Walker

INVENTOR.
Brooks Walker

United States Patent Office 3,057,423
Patented Oct. 9, 1962

1

3,057,423
HYDRAULIC JACK
Brooks Walker, 1280 Columbus Ave., San Francisco 4, Calif.
Filed Dec. 16, 1957, Ser. No. 703,213
11 Claims. (Cl. 180—1)

This invention pertains to improvements in hydraulic jacks for lifting motor vehicles. This application is a continuation-in-part of application, Serial No. 405,920, filed January 25, 1954 and since abandoned. It is realized that some types of hydraulic jacks have been provided on vehicles where the jacks are attached to the chassis or the axle and operated from controls within the vehicle. This invention, however, pertains more particularly to hydraulic jacks operated by pressure from a power steering pump where the jack itself is installed under the hood, under the floorboards or in the luggage compartment when in the inactive position and permanently connected with flexible hydraulic lines so that it might be moved from the point from which it is carried and used as a bumper jack to any corner of the car or used under the frame of the car to lift one wheel of one end of the car or to lift one whole side of the car.

The invention particularly pertains to valve circuits for the jack in which the hydraulic fluid, as from the power steering pump, is available to go through the power steering unit in its normal operation and also available to control the hydraulic jack, either with a selector valve located close to the hydraulic pump that makes the hydraulic jack work positively in either direction or holds the vehicle lifted with fluid flowing through the power steering unit, or with one valve used near the power steering to energize the longer lines either to the jack or to a second valve attached to or very close to the jack where the operator has easy control of the raising and lowering of the jack, while placing or removing the jack prior to and during the lifting operation.

Another feature of the invention is the provision of a two-way hydraulic jack for lifting the car, with provisions for hooks on the end of a cylinder and the end of the piston rod or thereabouts which are adaptable to hook on chains, cables, and the like, so that when the hydraulic cylinder is contracted by hydraulic pressure a substantial pull can be provided to pull the car out of a mudhole, etc. The force available for this pull is approximately the same as is available for lifting the car and is probably in excess of a thousand pounds.

By installing the jack with flexible lines no connection needs to be made to connect and disconnect the jack. Even when the jack is handling oil under high pressure, there is no danger of the oil spilling or spraying on the operator when he is making a connection or disconnecting it. One jack is sufficient for jacking the entire car as through the flexible connections it can be moved from place to place. No special provision is needed for safety as it is impossible to operate the jack to lower it against the road when the car is being driven down the road as it is inaccessible to the occupants and where even if it were operated it would not contact the roadway. This safety feature contrasts with the danger present in the conventional type of hydraulic jacks attached to the chassis or the frame. Also, no unsprung weight is added to the vehicle with this construction.

The types of valves employed in this invention are exceedingly simple and provide an open center flow for the liquid from the pump back to the pump when in the inactive position. This design and valve position also holds the jack hydraulically from movement. Two other valve positions control the raising and the lowering of the jack respectively and in most of these designs flow is also provided through the power steering unit which has flow

2 all times that the engine is running, and the valve is in the hold position or in the jack raising or lowering position during the raising or lowering operation.

Another feature of the invention is to provide a parallel circuit going through the longer lines to the jack through which a portion of the hydraulic fluid going to the pump may flow, so as to provide better cooling. It is usually economical to use smaller lines going to the jack than would be suitable for carrying the entire discharge of the pump to the power steering unit at all times, and therefore if a parallel circuit in the long lines to the jack is supplemented by a short, larger line no substantial restriction will be offered in the line from the pump to the power steering unit to increase the heating; and the cooling effect from passing a portion of the oil through the long line will cool all of the oil, during continued circulation.

Other features of the invention are more particularly pointed out in the accompanying specifications and claims.

I have illustrated my invention by way of example in the attached drawings, in which:

FIG. 1 is a cut away view, partly diagrammatic, showing one form of the invention.

FIG. 2 is a cut away view of the valve, shown in FIG. 1 in a different operating position.

FIG. 3 is a cut away view of the same valve in a third operating position.

FIG. 4 is a cut away view, mostly diagrammatic, showing another circuit for operating a one-way hydraulic jack.

FIG. 5 is a cut away view of the valve shown in FIG. 4 in the lift position.

FIG. 6 is a cut away view of the valve shown in FIG. 4 in the jack hold position.

FIG. 7 is a cutaway view, largely diagrammatic, showing another form of the invention.

Figure 8:
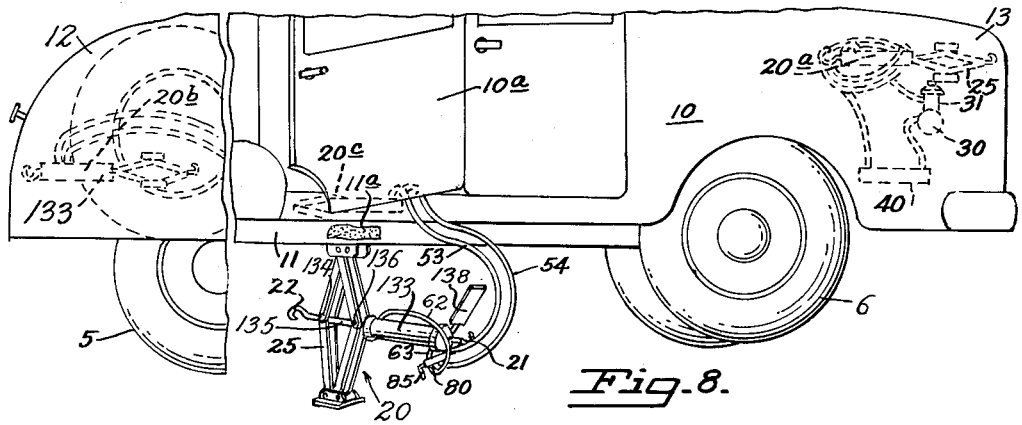
FIG. 8 is a side angle view of a portion of a vehicle and the hydraulic jack, incorporating another form of the invention.

FIGS. 14, 15, 16, and 17 represent side views of vehicles partly cut away showing other forms of the invention.

In all figures like numerals of reference refer to corresponding parts.

In FIGS. 1, 2, and 3 I have shown an engine-driven pump 30, such as is used for power steering, having a reservoir 31, a cover 32 held on by nut 33, and an inlet pipe 34. An outlet pipe 35 leads into jack control valve 90 through port 37. Valve 90 has a sliding plunger 91 with an opening 92 at the left end of the plunger 91 (as viewed in FIGS. 1, 2, and 3) and a plurality of small openings 93 near the inner periphery of opening 92 which lead into an annular passage 95. A central hole 94 leads partially through plunger 91 and provides passage through radial holes 98 to an annular passage 97. O-ring 91a forms a suitable seal at one end of the valve plunger 91. Extension 91b is urged outwardly by spring 99 which therefore urges the valve plunger 91 normally to the right. Bell crank 110 pivoted at pivot 111 is operated to push the plunger 91 to the left by a flexible cord, lanyard, or Bowden wire 112 which extends to a point near where the jack is to be used.

Jack 100 is of the double-acting type, with piston 100a and piston rod 100b carrying hooked end 104, which engages the socket in a ground engaging shoe 105. Hook 103 at the other end of the jack cylinder 107 enables the jack 100 to act as a pulling device when hooked to a chain or the car and to a stationary object, like a car with the brakes locked, tree, post, stake, etc., somewhat like the use shown in FIG. 13.

In the position shown in FIG. 1, oil flows from pump 30, through line 35 and port 37, into valve 90, into opening 92, through openings 93, to annular passage 95. From there it flows through a port 38 into a line 36 which leads to a power steering booster cylinder 40 (or booster means) and thence back through line 39 to pump 30, and through pump 30 intake port to reservoir 31 in the conventional manner. Lines 101 and 102 leading to the opposite ends of the jack cylinder 100 are blocked off in this position of the valve, as shown in FIG. 1, which is the open-center position with free flow from pump 30 to the power steering 40 and the jack 100 blocked off to hold its position. Power steering of this type is shown in service manual training book, Packard Power Steering, February 1953, by Packard Motor Car Company, Detroit 32, Michigan.

When the bell crank 110 is operated by the lanyard 112 to push valve plunger 91 to the left to the position shown in FIG. 2, oil flows from pump 30 through line 35, port 37, through opening 92, openings 93, annular passage 95 and then out port 101a through line 101, and port 101b to cylinder 100. This causes the jack 100 to extend to lift the car, as through a grip 106 when placed under the bumper, through extension 100b and ground shoe 105 at the lower end of the lifting cylinder. At the same time a return line 102, connected to the bottom of cylinder 100 by port 102b, returns fluid from the bottom of cylinder 100. The fluid passes through port 102a, and annular passage 96 and port 38 into line 36 leading to the power steering 40.

When the bell crank 110 is moved still further, it moves the valve 91 still further to the left to the position shown in FIG. 3. In this position oil from the pump 30 flows through line 35, port 37, into opening 92, hole 94, small radial holes 98, annular passage 97, port 102a, and line 102 to port 102b in the lower side of the jack 100 to retract the piston rod hook end 104 or to effect a substantial pull through hooks 103 and 104. The return from the upper side of the cylinder 107 through port 101b to line 101 goes through port 101a to annular passage 96, and out port 38, through line 36 to power steering 40, and back to the pump 30 through line 39.

In the construction shown in FIGS. 4, 5, and 6 a valve is shown which is suitable for operating a jack 120 having a one-way hydraulic action and spring return, as is shown in FIG. 7. In FIGS. 4, 5, and 6 outlet pressure line 35 from the pump 30 is connected through port 113 to a valve 130 in which rotating valve mechanism 131 is mounted. As shown in FIG. 4, oil flows from line 35 through port 113, out port 114, through line 36 to power steering 40, back through line 39 to the power steering pump 30. In FIG. 4, line 124 which leads to the single acting jack (such as the jack 120 of FIG. 7) is connected with line 126 by port 115, valve 130, and port 116, for the return operation of the jack, as through the action of a spring 120a acting on the under side of the piston 123 (FIG. 7).

When the valve 131 is moved to the position shown in FIG. 5, oil flows from the pump 30 through line 35, port 113, valve 130, and port 115, directly into line 124, and port 117 (FIG. 7), to act on the top of piston 123 to extend the jack end 125 and shoe 105 for a lifting operation. When the jack has gotten to sufficiently high position, valve 131 is moved to the position shown in FIG. 6, in which port 115 and line 124 are closed off by valve 131. The line 126 leads by port 116 directly to the line 39, without going through the power steering 40. Pressure from the pump to power steering is not necessary while the car is being raised, and a built-in relief valve in the pump, which is common practice, will take care of limiting the maximum pressure in case the piston 123 comes to the end of its stroke during the lifting operation, before the valve 131 is turned to the hold open center (pump to power steering) position, shown in FIG. 6, or to the jack lower open center position, shown in FIG. 4.

In FIG. 7 a slightly different valve 129 is used. The valve 129 is placed between lines 36 and 39 after the pump 30 has delivered pressure through the power steering unit 40. Many power steering units are made to be capable of taking full pump pressure with no detrimental effect on valves, pistons, seals, etc. Valve 129 with its operating handle 127 in the position shown by solid lines, allows free flow from line 36 through port 118, valve 129, and port 119, to line 39 and back to the pump 30, with line 124 and port 128 blocked off to lock the piston 123 in jack 120.

Jack 120 has a piston 123 urged upwardly by spring 120a. Adjustable bumper engaging unit 121 has a clamp and handle 122 at the back side so that it can be moved up and down the cylinder 120 with handle 122 loosened for varying primary adjustments and locked by tightening handle 122 prior to the lifting operation. The lower end of piston rod has a ball 125 which is received in the socket in ground engaging shoe 105.

When the valve handle 127 is moved to position 127a, free flow is provided between line 124, port 128, port 118, and port 119, lines 36 and 39, allowing the free return of the jack. This allows the spring 120a to push piston 123 to the upper position. When the valve is moved to the position shown at 127b, a connection is provided between line 36, port 118, port 128, line 124, port 117, and the top of cylinder 120 above piston 123, so that the full pump pressure is effective to force piston 123 downwardly for effecting a jacking operation. When the jack has reached the necessary height, the handle 127 of the valve 129 may be returned to the solid-line position where line 124 and port 128 are blocked and free flow again is provided between line 36, port 118, port 119, said line 39, while holding the jack 120 in any desired position of lift.

Figure 10:
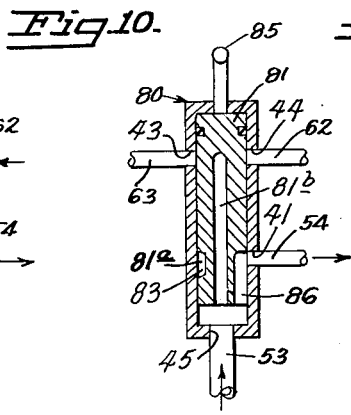
FIG. 10 is an other view of the control valve, as shown in FIG. 9, with the valve in a different position.
Figure 11:
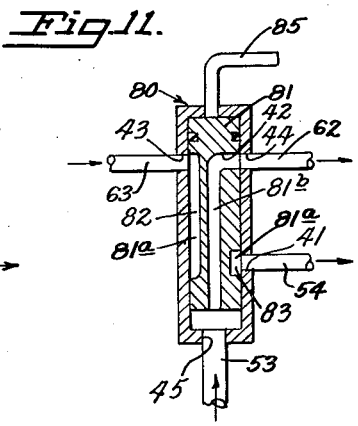
FIG. 11 is a third view of the same valve, with the valve in the third position.
Figure 12:
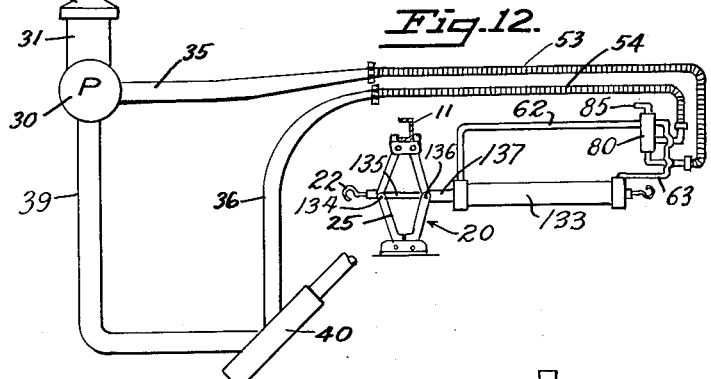
FIG. 12 is a sectional and diagrammatic view of the hydraulic circuit of the device of FIGS. 8–11.

In FIGS. 8, 9, 10, and 11 I have shown a different type of hydraulic jack 20 in which a hydraulic actuator 133 operates a scissors mechanism 25 by one toggle 134 of the scissors 25 being attached to the piston rod 135 and the other toggle 136 to a cylinder head extension 137 (see FIG. 12). Jack 20 engages the frame 11 under one side of the car to lift either one front wheel 6 or one rear wheel 5 or both front and rear wheels on one side of the car, depending upon the fore and aft placement of the jack 20 relative to the distribution of weight on the frame and on the axle drop as it exists before the jack lift, as caused by the springs, etc.

Figure 13:
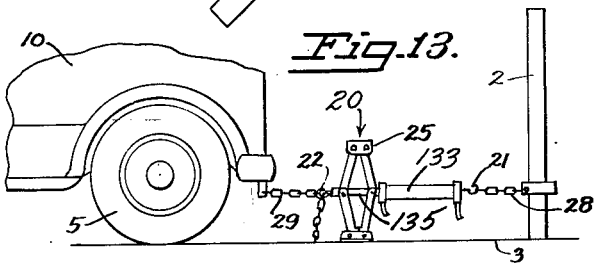
FIG. 13 is a view, partially cut away, showing another use of the invention.

A mirror 138 is provided on the jack 20 so that the operator looking down in the mirror 138 may see where to place the jack 20 to intercept the frame 11 at the desired location. As a further assistance the normal balance point 11a of the empty vehicle where the front and rear wheels will lift off the ground when lifted on the jack 20 at this point may be painted some distinguishing color. Hook 22 located at the end of the piston rod 135 and hook 21 located at the end of the cylinder provide a means whereby the hydraulic actuator 133 which operates the jack 20 may also be used as a retracting device to pull the car out of the mud, etc., as shown in FIG. 13.

Valve 80 (see FIGS. 9–11 especially) is mounted on the jack 20 and has control handle 85 which rotates plunger 81. Plunger 81 has port 81a which has a longitudinal slot 82 and an arcuate groove portion 83 that goes part way around plunger 81 in axial alignment with a port 41. Central port 81b goes part way through the center of the valve 81 and into a port 42 that intercepts port 43 or 44 depending upon the position of the valve 81.

Figure 9:
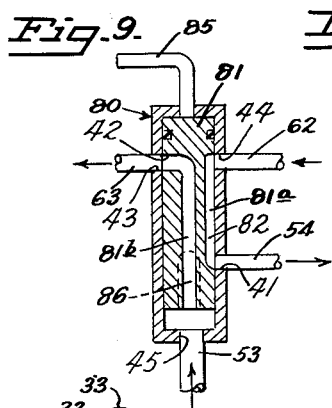
FIG. 9 is an enlarged view of a hydraulic control valve shown in FIG. 8.

In FIG. 9 I have shown the handle 85 turned to the left so that fluid comes from the pump 30 through line 53, port 45, through central port 81b and out 43 to line 63 which leads to the end of the cylinder away from the jack 20 and causes the piston rod 135 to be forced outwardly to retract the jack 20.

When the valve plunger 81 is moved to the position shown in FIG. 10, port 43 and line 63, and port 44, and line 62 leading to the end of the cylinder 133 nearer the jack scissors 25 are all blocked off by valve 81. Free flow from the pump line 53 and port 45 is then connected through a passage 86 and port 41 to line 54 leading back to power steering. Lines 53 and 54 are flexible and run between the jack and a point in the vehicle near where the jack is to be stored (e.g., in back of open door 10a of body 10) in a recess 20c under the floor boards, or at a location 20a under the hood 13 with the engine, or in the rear luggage compartment 12 at 20b. From any one of these storage places to the power steering pump 30 and power steering 40 either rigid or flexible lines 53 and 54 may extend, or, for example, if the storage space were about half way between the valve 50 and the valve 60 of FIG. 12, about half of lines 53 and 54 may be rigid and extend from the storage container wall 20a, 20b, or 20c of the jack 20 to the valve 50, and the balance of the lines 53 and 54 may be flexible and extend from the storage container wall 20a, 20b, or 20c to valve 60 of jack 20. The lines are long enough so that the jack may reach the frame where the whole side of the car may be lifted, or they may be longer so that the jack may be used as a bumper jack or so that it may pull the car either from the front or rear of the car to provide a forward or backward pull.

When the valve 80 is in the position shown in FIG. 11, passage is provided from the pump line 53, port 45 through the central port 81b to ports 42 and 44 and to line 62 which leads to the end of the cylinder 133 of jack 20 closest to the scissors 25 to retract the piston forward of the cylinder to cause the jack 20 to expand. At the same time the line 63 is connected through port 43, and port 81a to port 41 and return line 54, which goes to the pump 30 and reservoir 31 through power steering 40, so that the jack 20 may be raised until the end of the stroke or until valve handle 85 is turned straight back as viewed in FIG. 10.

In FIG. 13, I have shown an illustration of how the two-way hydraulic jack 20 may act to pull the car forward as out of the mud by anchoring a chain 28 to a tree or post or stake 2 driven in the ground 3, the other end of the chain being attached to hook 21. Another chain 29 is attached to the vehicle and engaged by hook 22 which can pull the car forward out of the mud by retracting the piston rod 135 of the hydraulic actuator cylinder 133 of jack 20. After it has been pulled a certain distance the chains 28 and 29 can be then reengaged for pulling it further by another stroke of the piston of the actuation cylinder 133.

Figure 14:
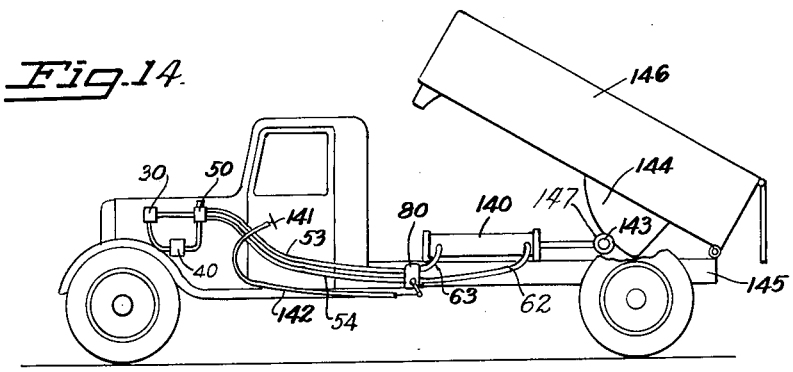

FIG. 14 shows the application of this invention to a dump truck where the power steering pump 30 operates power steering booster 40 by fluid that goes through solenoid actuated valve 50. Solenoid valve 50 also directs the discharge of pump 30 to a hydraulic actuator 140 via lines 53 and 54 and 62 and 63. The hydraulic actuator 140 operates roller shaft 143 which has some rollers (not shown) that ride on the vehicle frame 145 and other rollers 147 that ride against a cam 144 attached to dump body 146 in the usual way. Control lever 141 acts through Bowden wire 142 or hand brake type flexible controls to control the valve 80 which is an open center four-way valve as in FIGS. 9, 10 and 11. In operation solenoid valve 50 is closed, forcing full discharge from pump 30 through line 53, valve 80, line 54 and back through power steering to pump 30, which contains its own reservoir as before. Valve 80 through control 141 then operates cylinder 140 to raise or lower dump body 146 by directing pressure to line 63 to raise the body 146 or to line 62 to lower body 146.

Figure 15:
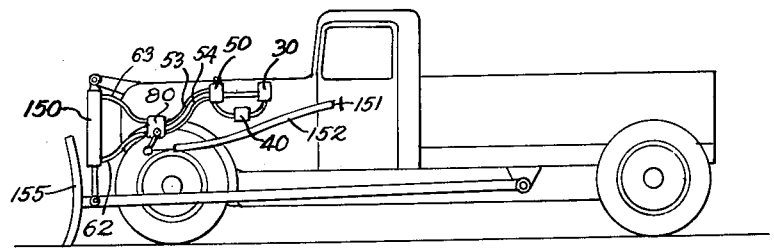

In FIG. 15 cylinder 150 operates a bulldozer blade 155, and the control is similar to that described in connection with FIG. 14 with handle 151 operating valve 80 by flexible control 152.

Figure 16:
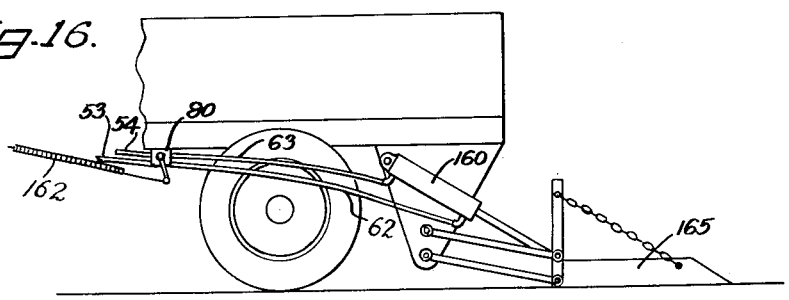

In FIG. 16 cylinder 160 operates a lift tail gate 165 in the usual manner. Control valve 80 is an open center four-way valve similar to those used in FIGS. 14 and 15. The operation is also similar.

Figure 17:
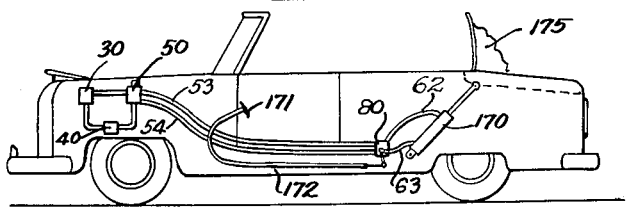

In FIG. 17 the cylinder 170 operates the convertible top 175 by mechanical linkages used in production of current automobiles when operated by hydraulic cylinders and is controlled by oil from power steering pump 30 going through solenoid valve 50, then through lines 53 and 54 to open center four-way valve 80 which controls the up and down action of top 175 by control handle 171 and flexible control 172 going to arm on valve 80.

In the designs shown in FIGS. 14–16 inclusive, the long lines 53 and 54 between solenoid valve 50 in the power steering circuit allows a parallel flow of a part of the power steering fluid through said long lines 53 and 54 when valve 80 is in open center position. This provides cooling and hydraulic cushion by the normal extension of the longer lines. The design also allows positive pump pressure for operating the hydraulic cylinders 140, 150, 160, and 170 respectively in each figure. With valve 50 left closed, the discharge of pump 30 will flow through or to four-way open center valve 80 and that valve only, itself controlled through handle 171, and will control the raising and lowering of the connected hydraulic cylinder and associated mechanism, as shown in FIGS. 14–16. The solenoid valve can be controlled from the driver's compartment and prevents accidental operation of the top by handle 171 alone unless the switch for the solenoid valve has been closed prior to operating handle 171.

Valve 80 of FIG. 14 which operates the dump body could be operated directly from the side of the vehicle close to the operating cylinder rather than through control lever 141. This operation is similar to the operation of jack 20 by valve 80, as shown in FIG. 12. Valve 80 of FIG. 16 can can also be operated directly from the side of the vehicle to control the tail gate rather than through cable 162.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim as my invention:

1. A motor vehicle, including in combination a car frame; a motor supported by said frame; wheels supporting said frame; a hydraulic power steering system having a fluid pump driven by said motor and a booster means, said pump having an inlet side and an outlet side, said booster means being connected directly to one of the sides of said pump; a valve interposed between the other of the sides of said pump and said booster means for full flow of the hydraulic fluid through the valve at all times; a hydraulic actuator connected to said valve, said valve having a first position where only the fluid from said pump outlet side flows through both said valve and said booster means back to said inlet, a second position where all said fluid from said outlet side of the pump flows via said valve to said actuator to operate it, and a third position where fluid flows through both the valve and booster means to the inlet side of the pump and the fluid from the actuator flows through said valve for return to the inlet side of the pump to retract said actuator; and control means for setting said valve in one of the three positions, whereby said pump can be used for said power steering and for said actuator by employing only the pump needed for power steering at the pressure required for power steering alone.

2. The motor vehicle of claim 1 in which said actuator is portable, first and second conduit means for said fluid, said first conduit means providing the stated connection between said valve and said actuator, said second conduit means providing the stated connections by which said valve is interposed between said pump and said booster means, a portion at least of one said conduit means being flexible.

3. The motor vehicle of claim 2, wherein said flexible portion is in said first conduit means between said actuator and said valve.

4. The vehicle of claim 1 in which there is a single conduit between said actuator and said valve and said actuator is provided with spring means normally retaining said actuator in a retracted position except when pressure through said conduit moves said actuator to the operated position.

5. A motor vehicle, including in combination a car frame; a motor supported by said frame; wheels supporting said frame; a hydraulic power steering system having a fluid pump driven by said motor and a booster means, said pump having an inlet side and an outlet side, said booster means being connected directly to one of the sides of said pump; a valve interposed between the other of the sides of said pump and said booster means for full flow of the hydraulic fluid through the valve at all times; a hydraulic actuator connected to said valve, said valve having a first position where only the fluid from said pump outlet side flows through both said valve and said booster means back to said inlet, a second position where all said fluid from said outlet side of the pump flows via said valve to said actuator to operate it, and a third position where fluid from the actuator flows through both the valve and booster means to the inlet side of the pump to retract said actuator; and control means for setting said valve in one of the three positions, whereby said pump can be used for said power steering and for said actuator by employing only the pump needed for power steering at the pressure required for power steering alone.

6. The motor vehicle of claim 5 in which said actuator is portable and including conduit means for the fluid forming the connection by which the valve is interposed between the other of the sides of the pump and the booster means, at least a segment of said conduit being flexible.

7. The motor vehicle of claim 6 wherein said actuator is operatively connected to a portable jack, said car frame having means for storing said jack when said jack is not in use, said conduit means having a portion with one end permanently located at said means for storing and its other end connected to said actuator, said portion including the segment that is flexible and wherein the length of said portion is longer than the longest distance from said means for storing to those points on said car frame beneath which said jack should be placed to raise each of said wheels off the ground.

8. The vehicle of claim 7 in which said means for storing said jack is a luggage compartment of said vehicle, the length of said portion enabling said jack to be moved into a plurality of positions to raise one or more wheels off the ground.

9. The vehicle of claim 7 in which said means for storing said jack is at a location approximately midway between the vehicle's front wheels and its rear wheels, said flexible segment being shorter than the wheelbase of said vehicle and long enough so that the jack can be moved into position for raising any wheel off the ground.

10. The motor vehicle of claim 5 wherein the connection between said actuator and said valve is by means of a pair of conduits, one to each side of said actuator.

11. The vehicle of claim 9 in which said power steering system has pipes that do the stated connecting of said booster means to said valve and pump and in which said conduit means is small in cross sectional area and long, as compared with said pipes of said power steering system.

References Cited in the file of this patent

UNITED STATES PATENTS

| | | |
|---|---|---|
| 1,937,457 | Wuebben et al. | Nov. 28, 1933 |
| 2,024,844 | Berman | Dec. 17, 1935 |
| 2,216,518 | Parsons | Oct. 1, 1940 |
| 2,328,970 | Farquhar | Sept. 7, 1943 |
| 2,363,179 | Harrington et al. | Nov. 21, 1944 |
| 2,402,449 | Rockwell | June 18, 1946 |
| 2,403,325 | Armington | July 2, 1946 |
| 2,513,246 | Moench | June 27, 1950 |
| 2,674,092 | Gardiner | Apr. 6, 1954 |
| 2,716,537 | Galouska | Aug. 30, 1955 |
| 2,746,554 | Matthews | May 22, 1956 |

OTHER REFERENCES

Publication: "Commercial Car Journal," June 1952, pages 72, 73, 124, 126, 128, article "Mack Introduces Hydraulic Controlled Bus."